Dec. 18, 1934.    L. R. SESSIONS ET AL    1,984,766
MOTOR VEHICLE JACK
Filed July 22, 1933    2 Sheets-Sheet 1

Inventors
Loys R. Sessions
Joseph B. Black
By Jack A. Ethley
Attorney

Dec. 18, 1934.  L. R. SESSIONS ET AL  1,984,766
MOTOR VEHICLE JACK
Filed July 22, 1933   2 Sheets-Sheet 2
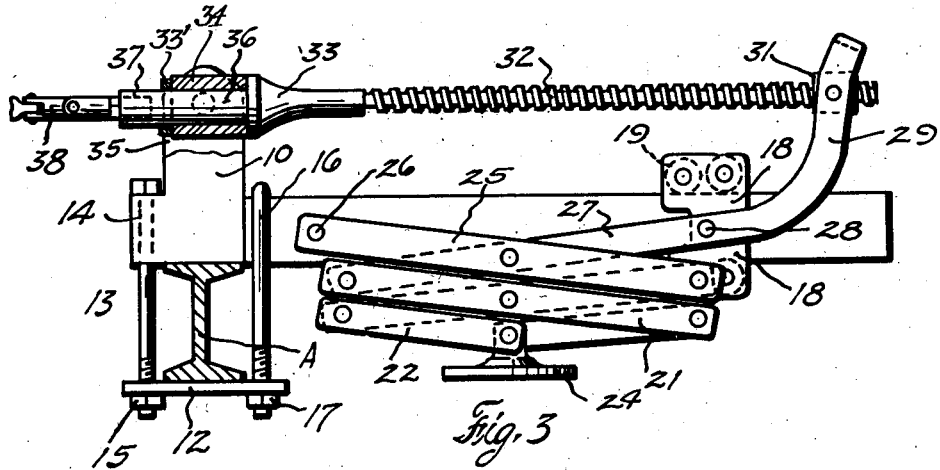
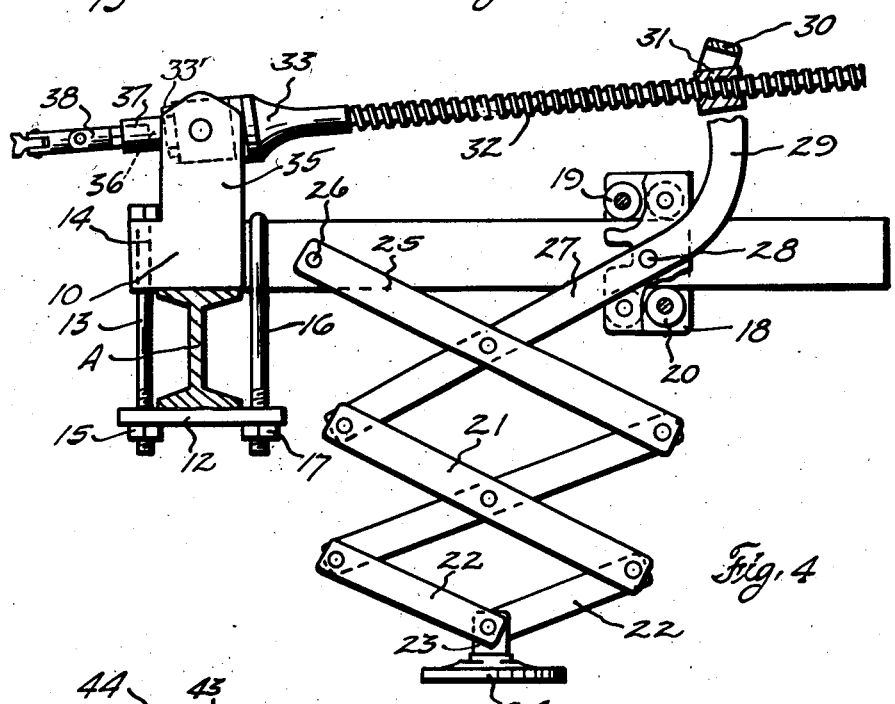
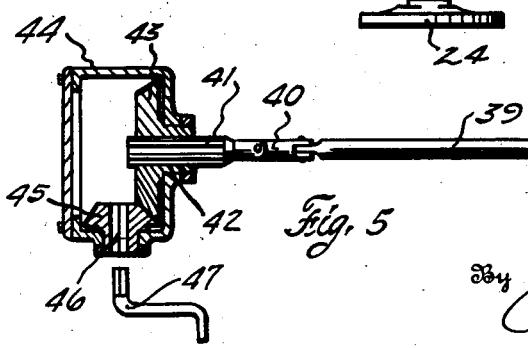
Inventors
Loys R. Sessions
Joseph B. Black
By Jack A. Ehley
Attorney Patented Dec. 18, 1934

1,984,766

UNITED STATES PATENT OFFICE 1,984,766

MOTOR VEHICLE JACK

Loys R. Sessions and Joseph B. Black, Waxahachie, Tex.

Application July 22, 1933, Serial No. 681,732

10 Claims. (Cl. 254—86)

This invention relates to new and useful improvements in motor vehicle jacks.

One object of the invention is to provide an improved jack adapted to be permanently mounted on the motor vehicle, whereby it will be available at all times for immediate and convenient use.

A particular object of the invention is to provide an improved jack having means for raising and lowering each wheel with a minimum expenditure of effort and in an expeditious manner.

Another object of the invention is to provide an improved jack having its operating means mounted at a safe place on the side of the frame and removed from the wheel, and readily accessible for the insertion of the operating crank.

A construction designed to carry out the invention will be hereinafter described together with other features of the invention.

Figure 1:
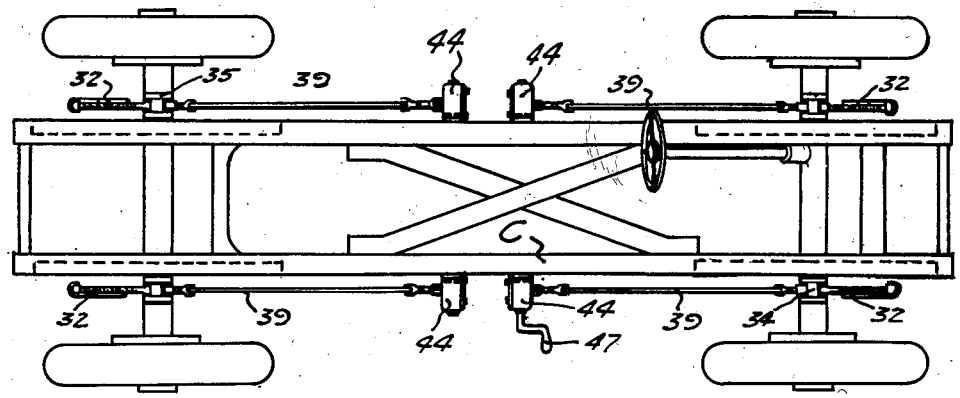
Figure 2:
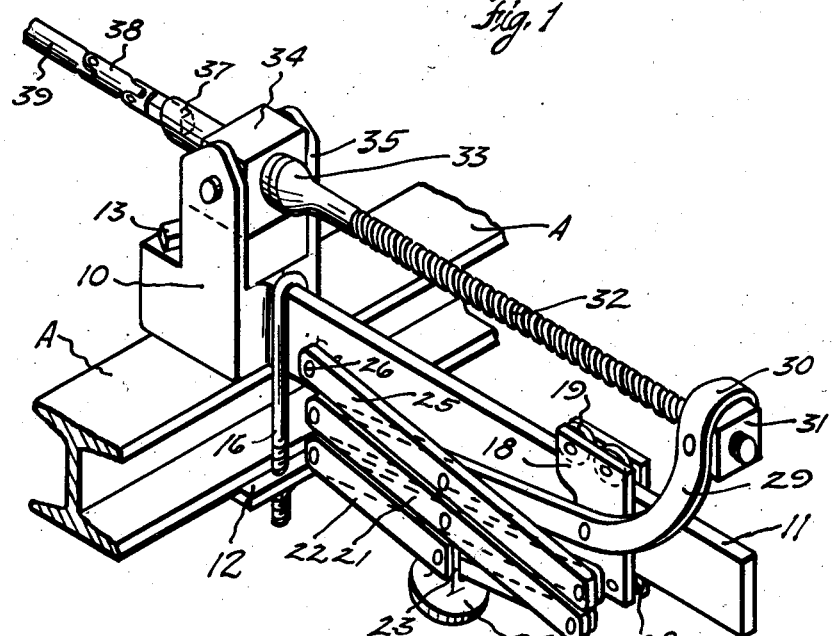
Figure 6:
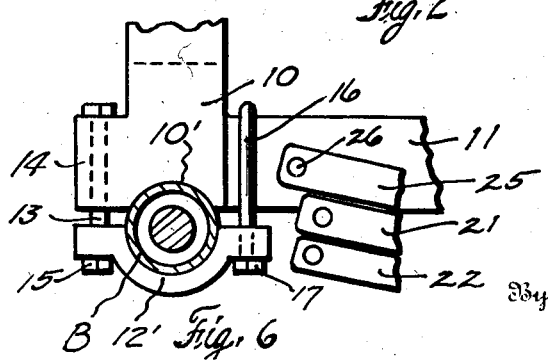

The invention will be more readily understood from a reading of the following specification and by reference to the accompanying drawings, in which an example of the invention is shown, and wherein:

Figure 1 is a plan view of the major portions of the chassis of a motor vehicle equipped with jacks constructed in accordance with the invention, Figure 2 is a perspective view of one of the jacks in its retracted or elevated position, Figure 3 is a side elevation of the same, Figure 4 is a side elevation showing the jack lowered or extended for raising the wheel from the ground, Figure 5 is a horizontal cross-sectional view of one of the gear boxes, and Figure 6 is a detail of the rear axle mounting.

In the drawings the numeral 10 designates a head block having a hanger bar or arm 11 extending therefrom and preferably made integral therewith. The blocks are fastened on the front axle A and rear axle B of the chassis and are modified according to the shape of the axle. The front axle A, usually being an I-beam, the block is provided with a flat bottom so as to rest on top of the axle. A clamping plate 12 is placed against the under side of the axle for receiving bolts 13 depending from a lug 14 on the rear side of the front block. These bolts are fastened by nuts 15. A U-bolt 16 is looped over the bar 11 and fastened in the plate on the front side of the axle by nuts 17. In this manner the block is securely fastened on the front axle. As the housing of the rear axle B is usually cylindrical, the bottom of the block is provided with a curved seat 10' fitting on top of the housing and the clamping plate is provided with a curved seat 12' fitting the underside of the housing. Otherwise the clamping elements are the same.

The front bars 11 are directed forwardly of the front axle A and the rear bars 11 are directed rearwardly from the rear axle, but this is subject to variation. As each jack is the same, a description of one will explain the features of the other three. It is preferable to provide a separate jack for each wheel and to separately operate each jack, however, the invention is not to be limited to separate operation.

A carrier 18 is mounted to slide longitudinally on the bar 11 and encloses a pair of upper bearing rollers 19 and a pair of lower bearing rollers 20. These rollers engage the top and bottom edges of the bar and provide for easy sliding of the carrier. One of the principal features of the invention is the lifting member which includes a plurality of crossed and pivoted arms 21 constituting what is commonly known as lazy-tongs. At their lower ends the tongs are pivotally connected to links 22 which are pivoted at their center to a stud 23 rising from the center of a circular base or foot piece 24, which, however, may be of any suitable form and shape.

One of the upper levers 25 of the lifting member is pivoted at 26 to the bar 11 near the head block 10, while the other upper lever 27 is pivoted to the side of the carriage at 28 in horizontal alinement with the pivot 26. This gives the top of the lazy tongs one fixed pivot and one sliding pivot. This is a very important feature because it enables a much quicker operation and simplifies the structure.

The lever 27 has an upwardly curved extension 29 which projects above the carrier 18. The extension is bent upon itself to form a hanger 30 in which a nut 31 is pivoted. A coarse screw 32 is threaded through the nut and is provided with a head 33 bearing against the front side of a pivot block 34 journaled in standards 35 extending upwardly from the head block 10. As is shown in Figure 3, the head has a reduced shank 36 journaled in the block 34. A bearing 33' is suitably secured on the shank 36 and bears against the rear side of the block 34 to prevent forward displacement of the shank within said block. By rotating the shank, the head and screw will be rotated, whereby the nut 31 will travel longitudinally of said screw.

It is apparent that when the nut 31 is moved longitudinally of the screw 32, the lever 27 will be swung on its pivot 28, whereby the screw will be swung through the medium of its block 34. The extension 29 will cause the carrier 18 to move longitudinally of the bar 11. When the screw is turned in a clockwise direction from its head 33, the nut 31 will be moved inwardly from the position shown in Figure 3 to the position shown in Figure 4, whereby the lazy-tongs 21 will be extended or lowered as is shown in Figure 4. During this action, the carriage 18 is slid along the bar 11 and owing to the fixed pivot point 26, the lazy tongs will be rapidly extended. In previous devices, both upper arms on the lazy-tongs have been actuated, which entails more parts and a slower extension. However, the particular advantage secured by the sliding carriage and the fixed pivot 26 is an increased leverage and greater power, thus making the lifting of the load less laborious.

It is obvious that any suitable means might be employed for rotating the screw 32 and this may be carried out either manually or mechanically. The screw could be driven either by the motor of the automobile or by an auxiliary motor, and such is contemplated with the invention. As a simple operating means, we provide the shank 36 with a socket 37, which receives the angular end of a universal joint 38. This joint is pivotally connected by a rod 39 with a second universal joint 40. The joint 40 is connected with a spline 41, which extends through the hub 42 of a beveled gear 43. The gear 43 is rotatably confined in a case 44 rigidly mounted on the frame C of the chassis. The spline has the usual sliding and turning connection in the gear, and with the universal joints, compensates the up and down movement of the axle A on which the head block 10 is fastened. A beveled pinion 45 is rotatably mounted in the case and has a wrench socket 46 for receiving the crank 47.

It is obvious that all of the parts, except the crank 47, are permanently mounted on the chassis of the motor vehicle. When it is desired to raise one of the wheels it is merely necessary to insert the crank 47 in the wrench socket 46 and rotate the pinion 45 and gear 43, whereby the screw 32 will be turned. The crank is turned in a clockwise direction, which causes the gear 43 to be turned in a like direction, with the result that the nut 31 will travel inwardly on the screw and lower the base 24. When the vehicle is being lifted, the load will be carried by the lower rollers 20, but whenever the load is shifted from the base 24 to the wheel of the vehicle, then the rollers 19 will support the lifting member. The lazy tongs are retracted by rotating the parts in a counter-clockwise direction.

It is pointed out that the device is simple and compact and easily attached to a motor vehicle. When the lifting member is retracted, as shown in Figure 3, the base 24 will be above the bottom of the front axle A, thus protecting it from injury, should the axle strike anything. This is an improvement over many of the devices in the prior art. The sliding carriage 18 is a more mobile element than a pair of nuts traveling on right and left hand screw threads. It will be apparent that there is practically no transverse load on the screw 32, because the load is carried by the pivots 26 and 28 and the bar 11.

The description which has been given recites more or less detail of a particular embodiment of the invention, which is set forth as new and useful, however, we desire it understood that the invention is not limited to such exact details of construction because it is manifest that changes and modifications may be made, within the scope of the appended claims, without departing from the spirit of the invention.

What we claim and desire to secure by Letters Patent, is:

1. A motor vehicle jack comprising, a hanger bar, means for rigidly fastening said bar to the axle of a motor vehicle, a lifting member including a plurality of pivoted arms, one of which is pivoted at a fixed point on said bar, a carrier slidable on said bar, another of the arms of the lifting member being pivoted to the carrier and having an extension, and means for swinging said extension to slide said carrier and actuate said lifting member.

2. A motor vehicle jack comprising a hanger bar, means for rigidly fastening said bar to the axle of a motor vehicle, a lifting member including a plurality of pivoted arms, one of which is pivoted at a fixed point on said bar, a carrier slidable on said bar, another of the arms of the lifting member being pivoted to the carrier and having an extension, a nut pivoted to the extension, a single screw engaging in said nut, means for supporting said screw, and means for rotating said screw.

3. A motor vehicle jack comprising, a support, means for rigidly fastening said support to the axle of a motor vehicle, a lifting member including a plurality of pivoted arms, one of which is pivoted at a fixed point on said support, a carrier slidable on said support and pivotally connected with one of the arms of the lifting member, means above the carrier and free from connection therewith, said means being connected with the arm of the lifting member which is pivoted to the carrier for sliding the carrier on the support to extend and retract the lifting member, and a ground support pivotally connected to the lower end of the lifting member.

4. A motor vehicle jack comprising, a support, means for rigidly fastening said support to the axle of a motor vehicle, a lifting member including a plurality of pivoted arms, one of which is pivoted at a fixed point on said support, a carrier slidable on said support and pivotally connected with one of the arms of the lifting member, the latter arm extending upwardly from the carrier and a screw connected with the extension of said arm of the lifting member which is pivoted to the carrier for actuating said lifting member.

5. A motor vehicle jack comprising, a support, means for rigidly fastening said support to the axle of a motor vehicle, a lifting member including a plurality of pivoted arms, one of which is pivoted at a fixed point on said support, a carrier slidable on said support and pivotally connected with one of the arms of the lifting member, a screw above the carrier and free from connection therewith, said screw being connected with the arm of the lifting member which is pivoted to the carrier for actuating said lifting member, and means including a gearing for rotating the screw.

6. A motor vehicle jack comprising, a head block, means for fastening the head block on the axle of a motor vehicle, a hanger bar rigid with and extending longitudinally from the head block, a carrier slidable on the bar, a lazy-tong lifting member pivoted to the bar and also pivoted to the carrier, and means for actuating the lifting member.

7. A motor vehicle jack comprising, a head block, means for fastening the head block on the axle of a motor vehicle, a hanger bar extending from the head block, a carrier slidable on the bar, a lazy-tong lifting member pivoted to the bar and also pivoted to the carrier, an extension connected with the lifting member at its pivot point on the carrier, a nut carried by the extension, and a screw engaging said nut.

8. A motor vehicle jack comprising, a head block, means for fastening the head block on the axle of a motor vehicle, a hanger bar extending from the head block, a carrier slidable on the bar, a lazy-tong lifting member pivoted to the bar and also pivoted to the carrier, an extension connected with the lifting member at its pivot point on the carrier, a nut carried by the extension, a screw engaging said nut, a supporting block pivoted on the head block and in which the screw is journaled, a case for mounting on the frame of a motor vehicle, gears in said case, and a flexible connection between the gears and the screw for rotating said screw.

9. A motor vehicle jack comprising, a hanger bar, means for rigidly fastening said bar to the axle of a motor vehicle, a lifting member including a plurality of pivoted arms, one of which is pivoted at a fixed point on said bar, a carrier slidable on said bar and having another of the arms of the lifting member pivoted thereto, and a single screw connected to the arm which is pivoted to the carrier to swing said arm and operate the lifting member.

10. A motor vehicle jack comprising, a hanger bar, means for rigidly fastening said bar to the axle of a motor vehicle, a lifting member including a plurality of pivoted arms, one of which is pivoted at a fixed point on said bar, a carrier slidable on said bar and having another of the arms of the lifting member pivoted thereto, the end of said arm extending upwardly from the carrier, a single rotatable screw connected to the extending end of said arm for swinging the arm to slide said carrier and operate the lifting member, a gearing mounted on the frame of the motor vehicle, an operating connection between the gearing and the screw including universal joints, and means for operating said gearing to rotate the screw.

LOYS R. SESSIONS.
JOSEPH B. BLACK.